United States Patent [19]

Tsuruta et al.

[11] Patent Number: 4,500,935
[45] Date of Patent: Feb. 19, 1985

[54] PACKAGE SUBSTATION IN TANK WITH SEPARATE CHAMBERS

[75] Inventors: Keiji Tsuruta, Takarazuka; Nagayuki Tsutsumi, Suita, both of Japan

[73] Assignee: Mitsubishi Denki Kabushiki Kaisha, Japan

[21] Appl. No.: 411,974

[22] Filed: Aug. 26, 1982

[30] Foreign Application Priority Data

Sep. 2, 1981 [JP] Japan .......................... 56-131062[U]

[51] Int. Cl.³ .......................... H05K 7/20; H02B 7/06
[52] U.S. Cl. .................................. 361/333; 361/334; 361/385
[58] Field of Search ............... 174/52 R, 52 S, 15 R; 361/331, 332, 333, 334, 335, 356, 357, 382, 385, 390, 391, 393, 394, 429

[56] References Cited

U.S. PATENT DOCUMENTS

| 1,843,286 | 2/1932 | Jansson | 361/333 |
| 1,874,808 | 8/1932 | Ruppel | 361/333 |
| 2,960,672 | 11/1960 | Kowatschitsch | 336/105 |
| 3,448,422 | 6/1969 | Derippe | 174/14 R |

FOREIGN PATENT DOCUMENTS

| 669306 | 4/1931 | Fed. Rep. of Germany | 336/58 |
| 2515192 | 10/1976 | Fed. Rep. of Germany | 336/105 |

Primary Examiner—G. P. Tolin
Attorney, Agent, or Firm—Leydig, Voit, Osann, Mayer and Holt, Ltd.

[57] ABSTRACT

The invention deals with a package substation in which a plurality of elements which constitute a substation are accommodated in a tank, the elements are isolated by separator walls which constitute accommodation chambers, and said accommodation chambers are filled with insulation fluids that are adapted to the elements which are accommodated in said accommodation chambers.

1 Claim, 4 Drawing Figures

PACKAGE SUBSTATION IN TANK WITH SEPARATE CHAMBERS

BACKGROUND OF THE INVENTION

This invention relates to a package substation which consists of a transformer, a switchgear of the high-tension side, and a low-tension switch-board. So far, the package substation of this type has been made up, as shown in FIGS. 1 and 2, of a transformer container 11 which accommodates elements 3, a high-tension side switchgear container 12 accommodating an element 5, and a low-tension switch-board container 13 accommodating an element 6, the containers being installed in a separately constructed substation tank 1. The above-mentioned conventional setup, however, involves defects as mentioned below. Namely, increased number of containers are required to accommodate the elements and increased amounts of steel boards are required to construct the substation tank, resulting in the increased manufacturing cost. Furthermore weights and dimensions are increased so that increased costs are required for transportation and installation.

SUMMARY OF THE INVENTION

This invention is to eliminate the above-mentioned defects inherent in the conventional package substantions, and its object is to provide a package substation which can be cheaply constructed, which is light in weight, and which is small in size.

DESCRIPTION OF THE PREFERRED EMBODIMENT

Figure 1:
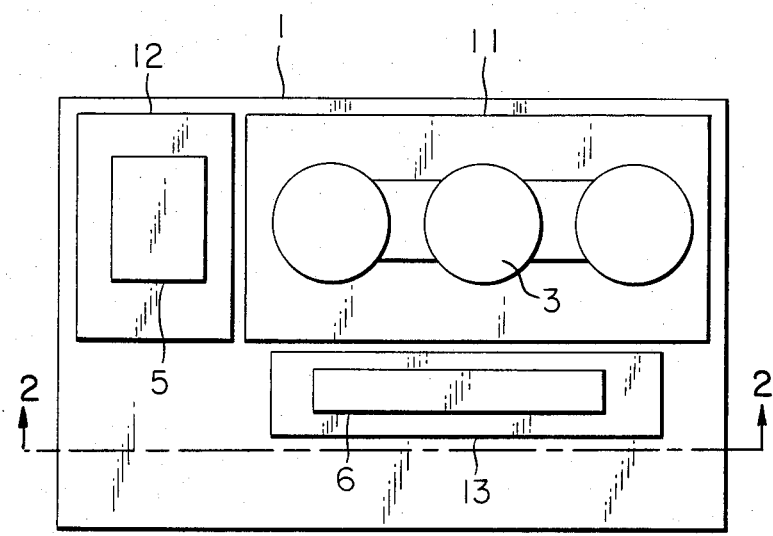
FIG. 1 is a diagrammatic plan view of a conventional package substation.
Figure 2:
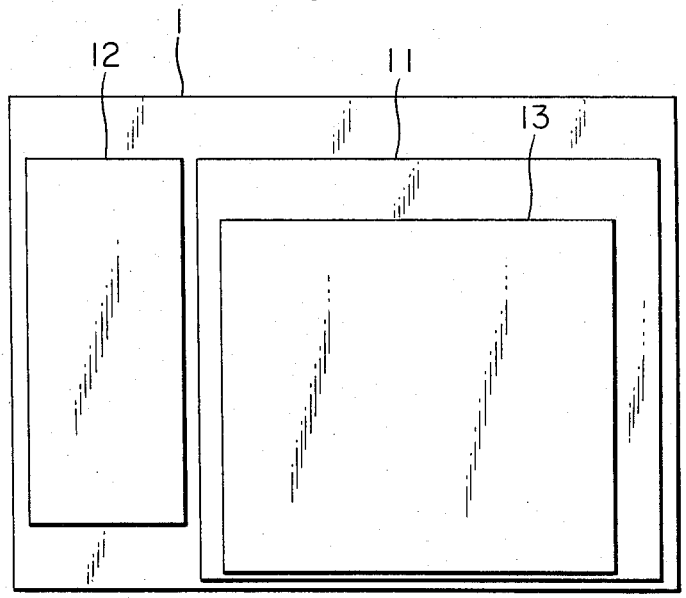
FIG. 2 is a cross sectional view taken in the plane of lines 2—2 of FIG. 1.
Figure 3:
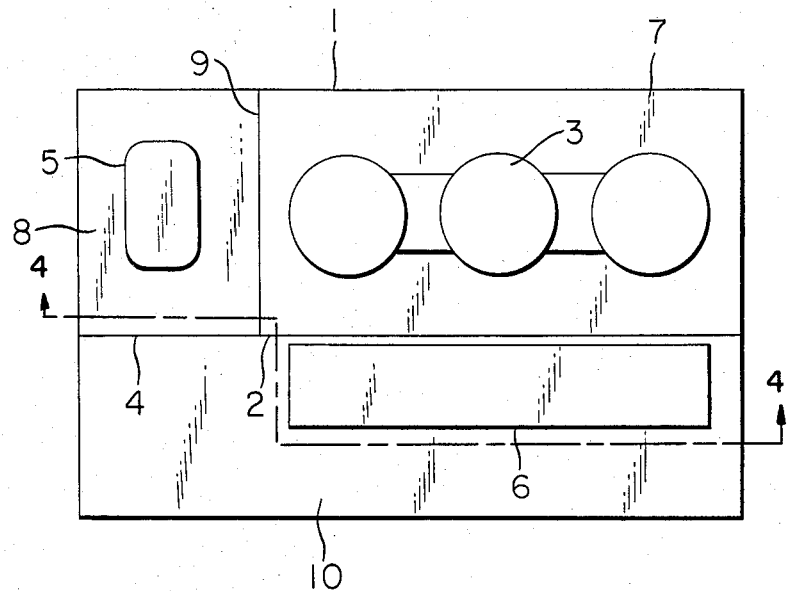
FIG. 3 is a diagrammatic plan view showing an embodiment of this invention.
Figure 4:
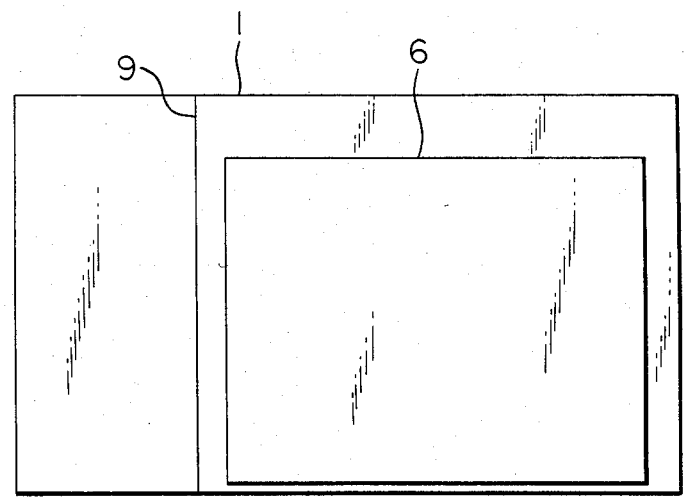
FIG. 4 is a cross sectional view taken in the plane of lines 4—4 of FIG. 3.

FIGS. 3 and 4 are a plan view and a cross sectional view showing an embodiment of this invention, in which reference numeral 1 denotes a substation tank, 2 denotes a separator wall for isolating the elements 3 of the transformer, 4 denotes a separator wall for isolating the element 5 of the high-tension switchgear, 6 denotes an element which consititutes the low-tension switchboard, 7 denotes a transformer chamber, 8 denotes a chamber of high-tension switchgear, and 9 denotes a member for separating the transformer chamber 7 from the high-tension switchgear chamber 8. The member 9 does not consist of an exclusively designed board but is formed simply as a section of the substation tank 1. Reference numeral 10 denotes a chamber for the low-tension switch-board 6. The transformer chamber 7 is filled with an insulation fluid such as mineral oil $SF_6$ or $C_2F_6$, and the high-tension switchgear chamber 8 is also filled with an insulation fluid such as mineral oil $SF_2$ or $C_2F_6$. The low-tension switch-board chamber 10 is filled with the atmospheric pressure.

Thus, the substation tank 1 is divided into three chambers 7, 8 and 10, and the separator walls 2, 4 are so provided that these chambers are filled with optimum insulation fluids. Consequently, the object can be accomplished without providing the transformer and the high-tension switchgear with exclusively designed tanks. In other words, the invention provides a package substation which is light in weight, which is compact in size, and which can be cheaply constructed.

What is claimed is:

1. A package substation in which a plurality of elements which constitute a substation including a transformer, low tension switchgear and high tension switchgear, are accommodated in a tank, said tank having an outer surrounding wall, separator walls connected to said outer walls and other separator walls to form separate accommodation chambers which isolate said elements each from the others, and insulation fluids filling said accommodation chambers, said insulation fluids covering the elements which are accommodated in said accommodation chambers and said insulation fluids comprising liquids in said high tension switchgear and transformer accommodation chambers and gas in said low tension switchgear accommodation chamber, the liquid containing chambers being isolated and sealed from the gas containing chamber.

* * * * *